United States Patent [19]

Thompson

[11] 3,951,885

[45] Apr. 20, 1976

[54] METHOD OF MAKING MAGNESIUM OXYCHLORIDE CEMENT COFOAMED WITH SYNTHETIC RESIN

[75] Inventor: Henry Clark Thompson, Saratoga, Calif.

[73] Assignee: Thompson Chemicals, Inc., Palo Alto, Calif.

[22] Filed: Sept. 17, 1973

[21] Appl. No.: 397,833

Related U.S. Application Data

[63] Continuation-in-part of Ser. No. 194,557, Nov. 1, 1971, Pat. No. 3,778,304, which is a continuation-in-part of Ser. No. 811,616, March 28, 1969, abandoned, which is a continuation-in-part of Ser. No. 589,808, Oct. 27, 1966, abandoned.

[52] U.S. Cl. .......................... 260/2.5 AK; 106/107; 260/2.5 AJ; 260/2.5 B; 260/2.5 BE; 260/2.5 F; 260/2.5 FP; 260/2.5 R
[51] Int. Cl.² .................. C08K 3/18; C08G 18/14; C08G 8/22
[58] Field of Search................ 260/2.5 AK, 2.5 AJ, 260/2.5 FP, 2.5 R, 2.5 F, 2.5 B, 2.5 BE; 106/107

[56] References Cited
UNITED STATES PATENTS

| 3,130,174 | 4/1964 | Lloyd | 106/107 |
| 3,211,675 | 10/1965 | Johnson | 260/2.5 AK |
| 3,238,155 | 3/1966 | Harrell | 260/2.5 F |
| 3,354,099 | 11/1967 | Stegeman | 260/2.5 AK |
| 3,502,610 | 3/1970 | Thompson | 260/2.5 FP |
| 3,607,797 | 9/1971 | Rubens | 260/2.5 AK |
| 3,763,070 | 10/1973 | Shearing | 260/2.5 AK |
| 3,778,304 | 12/1973 | Thompson | 106/107 |

FOREIGN PATENTS OR APPLICATIONS

| 1,214,478 | 12/1970 | United Kingdom | 260/2.5 AK |
| 1,192,864 | 5/1970 | United Kingdom | 260/2.5 AK |

*Primary Examiner*—C. Warren Ivy
*Attorney, Agent, or Firm*—Limbach, Limbach & Sutton

[57] ABSTRACT

A method of making a foamed fireproof product of magnesium oxychloride cement and the resulting product. A porous substrate is impregnated with a foaming mixture of magnesium chloride, magnesium oxide, and frothing agent in water. The mixture hardens with small voids throughout the porous substrate, thus providing a fireproof product of low density. The cement mixture may be co-foamed with polyurethane foam. The fireproof products of relatively low density are particularly valuable for building and construction purposes. Magnesium powder is the preferred frothing agent which, in combination with a surfactant, induces a large volume of small bubbles that remain in the composition as it is set.

11 Claims, No Drawings

METHOD OF MAKING MAGNESIUM OXYCHLORIDE CEMENT COFOAMED WITH SYNTHETIC RESIN

CROSS-REFERENCE TO RELATED APPLICATIONS

This application is a continuation-in-part of application Ser. No. 194,557, filed Nov. 1, 1971, now U.S. Pat. No. 3,778,304 which is a continuation-in-part of application Ser. No. 811,616, filed Mar. 28, 1969, which in turn is a continuation-in-part of application Ser. No. 589,808, filed October 27, 1966, both now abandoned.

BACKGROUND OF THE INVENTION

This invention relates to a process of fireproofing and the resultant fireproof product. More particularly, it relates to fireproofing with foamed magnesium oxychloride cement.

Fireproofing of porous organic materials such as insulating board, fiberboard, and the like has long been a difficult problem. Most chemicals used for fireproofing are expensive in the amounts required, so that the economies of fiberboard are lost in preparation of the commercial fireproof product. Moreover, many of the materials used for "fireproofing" are in fact simply flame retardants, which resist the spread of flames and extinguish the fire by the release of chlorine gas or other extinguishing material. However, fire retardant and flame retardant materials do not prevent the burning of the organic constituents of the porous substrates. In many cases, smoke still is given off through the burning of the cellulose fibers or other organic materials often with the result that severe smoke damage is still possible even though open flames do not break out.

Materials which have layers of fireproof materials over burnable organic materials, such as gypsum board, also suffer shortcomings. Gypsum board is not suitable for exterior use because of severe sensitivity to water. In addition, the paper backing in gypsum board is burnable.

Materials like asbestos-cement board are fireproof, but they are so expensive and so dense that they have not achieved the wide commercial acceptance possible with low-cost materials.

Magnesium oxychloride cement has been known for many years as a flooring material. However, because of its density and lack of porosity, it has not been widely used in other applications. It has previously been suggested to introduce porosity into magnesium oxychloride cement in U.S. Pat. No. 1,429,451 by the intermixing of cork or other light material into the cement and thereafter heating to partially decompose the cork particles. Still, the product of this patent is so dense that it has not achieved acceptance in the building and construction trades for walls, roofing, etc.

It has been suggested to make building boards and roofing material from magnesium oxychloride cement in U.S. Pat. No. 1,372,118 by forming magnesium oxychloride cement in a foraminous support. However, the product obtained is so dense and heavy that its usefulness is limited.

A less dense board is described in U.S. Pat. No. 1,500,207 where a magnesium oxychloride cement surface resembling ornamental stone is coated on a fiberboard. However, the cement is only on the surface and fails to thoroughly wet all the fibers in order to render them fireproof.

Porous magnesium oxychloride cement is disclosed in U.S. Pat. No. 1,965,538. However, this patent does not relate to fireproofing of burnable products.

U.S. Pat. No. 2,702,753 relates to a foamed magnesium oxychloride tile having certain other ingredients. However, the magnesium oxychloride is not intended to fireproof other burnable materials.

U.S. Pat. No. 3,050,427 shows the use of fibrous glass in a binder. Of the binders listed in this patent, magnesium oxychloride cement is suggested as a possibility. However, the patent does not relate to fireproofing with foamed magnesium oxychloride cement.

SUMMARY OF THE INVENTION AND OBJECTS

This invention relates to relatively low density burnable materials which have been rendered non-burnable by the even distribution, throughout the burnable material, of foamed magnesium oxychloride cement. The even distribution of the cement may be accomplished by co-foaming the burnable foam with the foamed cement at the same time. The cement is foamed by the presence of a frothing agent which produces gas bubbles.

It is an object of this invention to provide an inexpensive, fireproof porous material having high strength properties and low density.

It is a further object of this invention to provide an improved process of manufacturing low density fireproof materials.

These and other objects of the invention will appear from the following description in which the preferred embodiments of the invention have been set forth in detail.

A DESCRIPTION OF THE PREFERRED EMBODIMENT

Magnesium oxychloride cement (sorel cement) is prepared by the reaction of magnesium chloride, magnesium oxide and water. The literature defines the reaction according to two net equations:

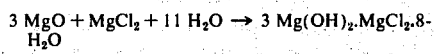

or

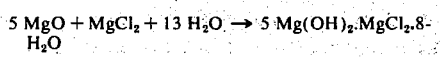

Magnesium oxychloride cement, before it has set, may be made to froth with the addition of frothing agent. By adding a frothing agent during the initial reaction period of the oxychloride cement a continuing froth is obtained which may be impregnated in porous materials. The frothing agent continues to form bubbles in the magnesium oxychloride cement within the porous material until the initial set of the cement takes place, at which time the bubbles are frozen into a low density fireproof product.

In preparing magnesium oxychloride cement, I prefer to add water to $MgCl_2 \cdot 6H_2O$ to form a mixture having a specific gravity of 22° Baume. In practice, this is approximately a 1:1 ratio with water. The specific gravity is important and should not exceed the range of 21.5° and 22.5° Baume where $MgCl_2 \cdot 6H_2O$ is used. About 4¼ pounds of magnesium chloride is added to water to make a gallon of liquid at 22° Baume. It follows that the range of 21.5° and 22.5° Baume is achieved by roughly the addition of 4 to 5 pounds of magnesium chloride with water to make a gallon. In practice, it is convenient to purchase solutions of magnesium chloride which are commercially available at about 36° Baume. The desired specific gravity may be achieved simply by the addition of water.

Where other magnesium chloride hydrates are used or where small amounts of the magnesium chloride are substituted with other cement forming materials (such as magnesium sulfate), the specific gravity may vary slightly beyond the above specified range. Ordinarily, no more than 2 or 3 per cent by weight of the total cement composition of magnesium sulfate should be included, since the water resistance properties are altered and the bubble size and degree of frothing are changed where greater amounts are included.

Magnesium oxide is added to the mixture of magnesium chloride in water to commence the reaction to form magnesium oxychloride cement. It is essential to have between 5 and 6½ pounds of magnesium oxide added per gallon of magnesium chloride solution to form a satisfactory cement.

The ratio of magnesium oxide to magnesium chloride is critical for the purposes of this invention. If significantly less than 5 pounds or more than 6½ pounds of magnesium oxide is added per gallon of magnesium chloride solution at 22° Baume, the strength properties of the resulting product are seriously diminished. That is, because of the low density of the foamed magnesium oxychloride cement, insufficient strength remains in the foamed product for commercial purposes if less than 5 pounds or more than 6½ pounds magnesium chloride is mixed per gallon of 22° Baume magnesium chloride. Since 22° Baume magnesium chloride has approximately 4.25 pounds of magnesium chloride in it, it is convenient to use the ratio of magnesium oxide to magnesium chloride. The preferred embodiment is a ratio of about 5¼ pounds magnesium oxide per 4¼ pounds of magnesium chloride, or a ratio of 1.23. The preferred range of magnesium oxide to magnesium chloride is about 1.23 to about 1.42.

However, since most magnesium chloride used in commercial practice of the invention is purchased in liquid form, the foregoing critical range of 5 pounds to 6½ pounds magnesium oxide per gallon of magnesium chloride at 22° Baume is a useful measure.

In practice, it is convenient to maintain a 22° Baume solution of magnesium chloride and water as a liquid component separate from the dry powder which is added to the liquid to commence formation of the cement. The dry powder may include appropriate fillers or solid additives as desired. Substantial amounts of fillers, may be included such as powdered limestone, marble dust, silica flour, and magnesium carbonate, depending upon the density of the final product desired. In molded roofing panels, for example, it is preferred to add 1½ parts insoluble filler per part of magnesium oxide powder. A combination of fillers may be used, such as marble dust in major amount, combined with silica flour and a small portion of pigment.

The magnesium oxychloride cement begins the initial set in about two hours. The first stage of setting is concluded in 3 or 4 hours after mixing. Thereafter, the cement continues to harden for a considerable period of time, much like other cements. With faster setting cement, such as is preferred with production molding applications, the initial set may commence in 30 minutes and the pieces removed from the mold in two hours. The cement will not be completely set for 24 hours.

The preferred frothing agent is powdered magnesium, which reacts with the oxychloride cement to continuously produce small bubbles. The precise chemistry of the reaction is not understood, but it is believed that the reaction gives off hydrogen gas. It is known that the powdered magnesium continues to generate gas bubbles until it is consumed. The mere entrainment of air bubbles is not satisfactory because the air invariably escapes to the atmosphere before the cement is set. Moreover, entrained air cannot generally be forced into the pores of a porous substrate. That is, when a liquid having air entrained therein is applied to a porous fiberboard or cellulose foam, for example, the porous material will sift out the entrained bubbles while only the liquid impregnates the porous material, making a dense product. On the other hand, by frothing the magnesium oxychloride cement with an internal foaming agent, bubble formation continues until the cement sets. It continues to form bubbles within the pores of the porous substrate so that a low density honeycombed product is obtained that is still fireproof.

In order to control the size of the bubbles generated by the reaction of the foaming agent and the magnesium oxychloride cement, I prefer to include a small amount of surfactant. Inasmuch as magnesium oxychloride cement system is basic, the surfactant should be anionic, although it is believed that certain nonionic surfactants are also suitable. The preferred detergent is a surfactant known as Rohm and Haas "S-100", defined by the manufacturer as isooctyl phenoxy polyethoxy ethanol containing 10 mols ethylene oxide. Other surfactants, such as GAF 5360, said to be a nonylphenoxypoly (ethyleneoxy) ethanol, or "Duponol Me" a fatty alcohol sulfate, are also highly satisfactory. The surfactant serves to control not only the size of the bubbles but also the amount.

Depending upon the particular surfactant, approximately ½ percent may be added based on the weight of the cement mixture. When smaller amounts of detergent or surface active agents are employed the amount of bubbles and the size of the bubbles is accordingly reduced. The surfactants vary greatly in ability to produce bubbles, so the weight of added surfactant must depend upon the material used. The range is generally from 0.01 to 1% of the weight of the mixture.

While the surfactant controls the size and amount of bubbles, it does not in itself contribute gas bubbles. In other words, the surfactant controls whether many small bubbles or few large bubbles will be produced by the frothing agent in the cement. In order to increase frothing, I have discovered that the addition of a small amount of lactic acid renders the froth much more reactive. Where vigorous foaming is desirable, I prefer to add about 0.1% lactic acid (based on the weight of the mixture) to the aqueous magnesium chloride component. When magnesium is the frothing agent added to the magnesium oxide component, a vigorous reaction commences upon mixing the components.

Lactic acid is believed to react with magnesium powder, which in turn reacts with the magnesium chloride. Frothing is increased about fourfold by the addition of 0.1% lactic acid. This increase in frothing may permit a decrease in the amount of magnesium required. Moreover the lactic acid serves as a cure control in that the reaction is exothermic. By increasing the temperature the time of curing the cement is reduced. Whereas normal curing of magnesium oxychloride cement takes about 2 hours for the initial set, the addition of a small quantity of lactic acid can reduce this time to less than 1 hour. Shortening of the curing time is important where the frothing mixture is introduced in the drying sequence of an existing line, as in the case of fireproofing fiberboard. The normal drying and compression period in making fiberboard is relatively short, so cure control by lactic acid permits flexibility in accommodating operation of existing capital equipment. In other applications, such as forming molded products, the higher temperature may not be desirable, so lactic acid may be omitted.

The frothing agent, such as powdered magnesium, may be added at any time after mixing of the cement ingredients and before the initial setting. In fact, the frothing agent may be combined with the dry magnesium oxide and packaged and stored. Then, when the magnesium oxide is added to the magnesium chloride in water, the mixture immediately begins to froth as well as to react to form a magnesium oxychloride cement. Where powdered magnesium is the frothing agent, it is preferably added in the amount of about 0.1% or less of the weight of the cement. It has been found that magnesium in an amount between 0.05 and 0.2% of the weight of the cement may be added to give satisfactory frothing.

The surfactant is conveniently added along with the powdered magnesium, although it may be added separately. Also, the surfactant may be packaged and stored with the magnesium oxide and powdered cement to make a simple, two-part recipe which simply requires the addition of water.

When the frothing combination of magnesium chloride, magnesium oxide, powdered magnesium, detergent and water is prepared, it is ready for coating, impregnating, laminating, or molding. These steps must take place before the initial set commences. In the absence of any additives, magnesium oxychloride cement sets about 120 minutes after the ingredients are mixed when ordinary commercial grades of calcined magnesium oxide are used. However, where calcining of the magnesium oxide takes place at a lower temperature and under appropriate conditions, the initial cure of the cement may be commenced much sooner. For most purposes, a 40 minute cure is highly satisfactory since it permits thorough impregnation and working of the product before the initial set and still does not require undue periods of waiting for curing during the processing step.

Insoluble fillers may be added where desired. For example, insoluble calcium carbonate, such as powdered limestone or marble dust, silica flour, magnesium carbonate, and other insoluble materials may be introduced. Ordinarily, soluble salts should be avoided because they can be leached out and reduce the strength of the foamed cement.

Magnesium oxychloride cement is at least four times as strong as Portland cement so that products fireproofed with oxychloride cement according to the present invention retain substantial strength along with low density. Moreover, Portland cement is moisture absorbent, while magnesium oxychloride is not. These properties permit utility in aircraft, for example, for soundproofing and insulation.

The density of the co-foam may be easily controlled by varying the ratio of polyurethane to cement. The lightest practical weight, while still retaining fire proof characteristics is 50% polyurethane and 50% cement. If more polyurethane is used, the fire resistance is lower and smoking is much greater. While pure foamed magnesium oxychloride cement has desirable properties, the advantages of the co-foam are lost when the weight of the cement exceeds 90% of the total. As a result, the preferred ratio of cement to urethane is between 1.0 and 9.0.

The strength and fire-resistance of the co-foam increases and the price decreases as the amount of cement is increased. Conversely, the density and flexibility increase with higher amounts of polyurethane.

It is preferable to heat the ingredients, particularly the magnesium chloride solution to speed up the reaction time. However, heating beyond 100° F. causes premature foaming of the gassing agent (usually Freon) in the polyurethane. The optimum temperature is 90°–100° F.

The sequence of mixing ingredients is not critical. It is helpful to bear in mind that the reaction time of the cement is considerably longer than that of the polyurethane, so it usually is desirable to add one of the urethane components last.

Suitable fillers may be added to the cement ingredients to extend or to provide different properties. Water-proof vermiculite and polystyrene bears are highly satisfactory for reducing the density of the resulting product. Ceramic nodules and glass beads may be included for strength without loss of fireproofing properties. Magnesium sulfate is a suitable extender for magnesium oxychloride cement to improve fire resistance. Chopped glass fibers give greater flexibility and strength to the product. Sawdust may be added without significant loss in fire proofing qualities because the cement is so completely intermingled with the polyurethane and filler that burning will not be sustained. Co-foamed products of this invention have improved fire proofing qualities over polyurethane foams impregnated with foamed magnesium oxychloride cement, presumably because of more complete mixing during formation.

The invention also has value in fireproofing burnable foams by introducing the frothing cement at the time of formation of the burnable foam. By co-foaming with frothing cement, complete intermixing takes place so that the resulting product is non-burning and yet of relatively low density. The density may be varied as desired for strength, fire-proof properties, and end use desired. Even non-burning resins, such as that described in my prior U.S. Pat. Nos. 3,502,610 and 3,663,720 may be rendered even more fireproof at a reduction in total cost when co-foamed with foamed magnesium oxychloride cement.

EXAMPLE 1

In the preparation of the froth, 19¼ pounds of magnesium chloride were added to 4¼ gallons of water. The specific gravity was measured and additional magnesium chloride was added to adjust the specific gravity to 22° Baume. The combined total makes about 5 gallons. 200 grams of lactic acid were added to the aqueous mixture. Magnesium oxide was then measured in an amount equal to 5.5 pounds magnesium oxide to each gallon of magnesium chloride in water. Then, 32 grams of powdered magnesium, which is about 0.1 percent of the dry weight of the magnesium oxychloride cement mixture and 100 grams of surfactant (Rohm and Haas X-100 defined by the manufacturer as octylphenol ethylene oxylate with an average of nine to ten mols of ethylene oxide per molecule) were added to the magnesium oxide component. The surfactant constituted about 0.5 percent of the dry weight of the total mixture. The dry magnesium oxide component was added to the aqueous magnesium chloride component and the mixture immediately began to froth.

EXAMPLE 2

In this example the cement was co-foamed with an NCO type polyurethane foam. 22° Baume magnesium chloride was ultimately reacted with magnesium oxide in a ratio of six parts oxide to ten parts chloride by weight. The combined oxide and chloride weight is referred to as "cement" weight and used as the basis for other ingredients. Polyurethane foam ingredients in the form of equal parts by weight of Decor foam No. 227 components A and B. The total weight of polyurethane foam components was 12.5% of the cement weight. The magnesium chloride was heated to a temperature of 98° F. A filler of vermiculite in the amount of 75% of the weight of cement was added to the oxide and the two components were mixed with the chloride. The B component of the polyurethane was added along with ½ of 1%, based on the weight of the cement, of surfactant (G.E. Silicone SF-1079). Upon mixing there is a slight rise in the liquid level because of the foaming agent in the B component. Cement expander (magnesium powder) is added in the amount of 1% of the cement and blended for two minutes. The A component of the polyurethane foam was then added and an immediate and vigorous reaction took place. Upon blending, the foaming mixture is immediately poured into a mold where it sets in approximately 20 minutes into a low density, non-burning product. Complete cure of the cement does not take place for several hours even though the molded product may be handled.

The product of Example 2 is light weight and has excellent fire resistance. When used as a 2 inch core for a door or wall, it has a rating of approximately two hours. Even the chlorinated polyurethanes commercially available as fire resistant will melt at 300° F. In contrast, the co-foam of this invention can withstand 1800° F. at which temperature it gradually spalls. There is essentially no smoke.

EXAMPLE 3

In this example a much heavier product is made, yet it is still half the weight of wood and completely fireproof. Cement ingredients are mixed in the ratio of six parts magnesium oxide to 10 parts by weight magnesium chloride. A polyurethane foam used to simulate wood and sold under the designation Decor Urewood was prepared in a separate container in an amount equal to 10% of the weight of the cement. Chopped glass fiber was mixed with the cement ingredients in an amount equal to 5% of the weight of the cement. Immediately after the A and B components of the polyurethane were mixed, it was blended with the remaining ingredients for 1–2 minutes and poured into a mold having graining resembling wood. The mixture gels within 30 minutes and is hard enough to be removed from the mold after one hour. Curing continues for at least 4 hours and the strength improves each day for several days, indicating that reaction continues long after removal from the mold. The product resembles wood, but is completely non-burning and will pass any fire test for building materials.

EXAMPLE 4

In this example the co-foam is made with cement and modified resorcinol-formaldehyde resin containing hydraulic cement as described in U.S. Pat. No. 3,502,610. The condensation resin system is available in two parts under the designation "Fire-X A and B" from Thompson Chemicals, Inc., Palo Alto, California. Two parts resin system were mixed with one part cement to make the co-foam. The resin system was prepared by mixing FIRE-X A with 15%, based on the weight of the "A", of FIRE-X B. G.E. Silicone 1079 and Freon 112 were added in an amount of ½% and 10%, respectively, of the weight of the polyhydric Phenolic Compound Fire-X A. In a separate container the magnesium oxide (6 parts) and magnesium chloride (10 parts) were mixed and magnesium powder expander added. The ingredients from the two containers were blended together and 1%, based on the weight of the polyhydric phenolic compound, Fire-X A of CaO catalyst was added. As soon as the catalyst was mixed the composition was poured into a mold. It commenced gelling within 30 seconds and immediately expanded to approximately twice its volume. Gelling was complete in approximately 5 minutes and was removable from the mold in 7 to 8 minutes. The resulting product had superior fire resistance to the product of U.S. Pat. No. 3,502,610 and yet had relatively low density.

EXAMPLE 5

In this example, magnesium oxychloride cement with frothing agent is co-foamed with polyurethane foam to make a low-density fireproof product. The magnesium oxychloride cement is prepared in accordance with the examples given above with the exception that six pounds of magnesium oxide is added per gallon of 22° Baume magnesium chloride, 0.1% by weight of magnesium powder is added per gallon of 22° Baume magnesium chloride. The oxide and chloride are mixed and the two parts of a standard polyurethane foam are added to the mixture. 60% by weight of the cement mixture is combined with 40% by weight of polyurethane foam prepared by mixing 50% of part A with 50% of part B of two pound density polyurethane foam ingredients commercially available from the CPR Division of Upjohn Corporation, Los Angeles, California. It is understood that the two parts of the polyurethane foam consists of a polyisocyanate and a polyol, as well as a Freon foaming agent and a catalyst. It is preferred to heat the mixture of cement and polyurethane as it is being mixed initially, but the reaction is exothermic so that continued heating is unnecessary. I have found that mixing is easier and the reaction is quicker where temperatures above 80° F. are maintained. After the cement and urethane components are mixed together, the mixture is placed in containers to make 50 pound buns which are sliced upon completion of the reaction in accordance with the usual practice with polyurethane foam. The final product has a density of approximately four pounds per cubic foot to give a light-weight fireproof product.

EXAMPLE 6

Co-foaming with unexpanded polystyrene beads is also possible with the present invention. In this example, precisely the same procedure set forth in Example 5 is followed with the exception that 10% by weight of the total cement and urethane mixture is added of unexpanded polystyrene beads. That is, for each 100 pounds of cement and urethane mixture, 10 pounds of unexpanded styrene beads are added to the mixture before foaming takes place. The heat given off by the formation of the urethane and magnesium oxychloride cement is sufficient to also foam and expand the styrene beads which are mixed thoroughly with the other ingredients to give a light-weight product. This product does not sustain burning, although a butane torch held to the final product will vaporize the expanded beads. Flame will not spread along the surface of the product.

The products of this invention are relatively low in density while very high in fire resistance, making them suitable for use in construction of buildings.

I claim:

1. In a method of preparing a fireproof material, the steps of mixing
    a. between 1 and 9 parts by weight on a dry basis of
        1. aqueous magnesium chloride having a specific gravity between 21.5° and 22.5° Baume,
        2. between 5 and 6.5 pounds magnesium oxide per gallon of aqueous magnesium chloride, and
        3. metallic frothing agent chemically reactive with ingredients (1) and (2) to produce bubbles in a foamed magnesium oxychloride cement with
    b. one part of the ingredients for synthetic resin foam and reacting the ingredients simultaneously to form a co-foamed product.

2. A method as in claim 1 wherein the synthetic resin is polyurethane.

3. A method as in claim 2 wherein the weight of the cement ingredients on a dry basis has a ratio to the weight of the polyurethane ingredients of between 1.5 and 9.0.

4. A method as in claim 2 wherein unexpanded polystyrene beads are added before reaction.

5. A method as in claim 1 wherein a filler is included in the co-foamed mixture.

6. A method as in claim 1 wherein the synthetic resin is resorcinol-formaldehyde.

7. A composition of matter comprising simultaneously co-foamed (a) magnesium oxychloride cement formed by mixing magnesium chloride in 21.5° to 22.5° Baume solution, 5 to 6.5 pounds magnesium oxychloride per gallon of magnesium chloride, and magnesium frothing agent, and (b) synthetic resin in which the cement ingredients are present in an amount between 1 and 9 parts by weight on a dry basis per part of synthetic resin.

8. A composition of matter as in claim 7 wherein the synthetic resin comprises polyurethane.

9. A composition of matter as in claim 7 wherein the synthetic resin comprises resorcinol-formaldehyde.

10. In a method of preparing a fire-resistant material, the steps of
    1. preparing a mixture of
        a. aqueous magnesium chloride having a specific gravity between 21.5° and 22.5° Baume,
        b. a polyol or polyester precursor for polyurethane foam,
    2. preparing a mixture of magnesium oxide in an amount between 5 and 6.5 pounds per gallon of magnesium chloride, a metallic frothing agent reactive with said chloride and oxide to produce bubbles, and an isocyanate-containing precursor for polyurethane foam,
    3. reacting the two mixtures to form a co-foamed fire resistant product.

11. A method as in claim 10 wherein one of said mixtures contains a gaseous foaming agent for polyurethane foam.

* * * * *